United States Patent [19]

Chelminski

[11] Patent Number: 5,432,757
[45] Date of Patent: Jul. 11, 1995

[54] LARGE-DIAMETER, CYLINDER-SHUTTLE SEISMIC AIRGUN METHOD, APPARATUS AND TOWING SYSTEM

[75] Inventor: Stephen Chelminski, Fitzwilliam, N.H.

[73] Assignee: Bolt Technology Corporation, Norwalk, Conn.

[21] Appl. No.: 180,547

[22] Filed: Jan. 12, 1994

[51] Int. Cl.⁶ .................. G01V 1/137; G01V 1/04; H04R 23/00
[52] U.S. Cl. .................. 367/144; 181/120
[58] Field of Search ............ 367/144, 20; 181/113, 181/118, 120

[56] References Cited

U.S. PATENT DOCUMENTS

| | | | |
|---|---|---|---|
| 4,038,630 | 7/1977 | Chelminski | 367/144 |
| 4,271,924 | 6/1981 | Chelminski | 181/120 |
| 4,364,446 | 12/1982 | Thomas et al. | 181/120 |
| 4,404,664 | 9/1983 | Zachariadis | 367/19 |
| 5,315,917 | 5/1994 | Mayzes | 91/418 |

OTHER PUBLICATIONS

"A Comprehensive Method for Evaluating the Design of Airguns and Airgun Arrays" by Bill Dragoset of Western Research, Division of Western Geophysical Company, dated Mar., 1984, presented at the 1984 Offshore Technology Conference in Houston, Texas, May 7–9, 1984.
"Air-gun array specs: A tutorial" by William H. Dragoset of Western Atlas International, Houston, Texas, which appeared in *Geophysics: The Leading Edge of Exploration*, Jan., 1990, pp. 24–32.
"Performance of 2000 and 6000 PSI Air Guns: Theory and Experiment" by Roy C. Johnston of Texas Instruments Incorporated, presented at the 41st Annual Meeting of the European Association of Exploration Geophysicists in Hamburg, West Germany (32 pages), Spring of 1979.
"The Performance of Marine Airgun Arrays of Various Lengths and Sizes" by Roy C. Johnston of Texas Instruments Incorporated, presented at the 48th Annual Meeting of the Society of Exploration Geophysicists in San Francisco, California (37 pages), Fall of 1978.

*Primary Examiner*—Ian J. Lobo
*Attorney, Agent, or Firm*—Parmelee, Bollinger & Bramblett

[57] ABSTRACT

A large-diameter, cylinder-shuttle airgun for seismic uses has a cylinder shuttle configured as a hollow, elongated cylinder body of revolution with an inwardly-facing cylinder guide surface and having two outwardly-extending, axially-spaced annular flanges. These two annular flanges are an operating flange at an upper end of the body of revolution and a firing flange at an intermediate region thereof. A cylinder skirt extends down below the firing flange, and the cylinder shuttle has an overall axial length L. The firing flange has a perimeter of outside diameter OD, and the ratio of L to OD is at least about 1 to 1. A cylinder housing of the airgun has a main inner cylinder structure encircled by the cylinder shuttle. This main inner cylinder structure may have an axial passageway of sufficient diameter for passing at least one compressed air hose and at least one multi-conductor electric cable axially therethrough. The housing provides an annular operating chamber for receiving the operating flange therein and has an annular firing chamber with removable interchangeable annular chamber walls for changing volume of the annular firing chamber. The skirt on the cylinder shuttle extends down into the firing chamber. The housing defines an annular discharge port positioned intermediate the operating and firing chambers and extending 360° around the axis of the housing. By employing a firing flange of large OD, a Torus bubble is produced of large "C" radius in relation to its axis of revolution which provides enhanced peak pressure output and improved PBR compared with a standard airgun.

22 Claims, 9 Drawing Sheets

LARGE-DIAMETER, CYLINDER-SHUTTLE SEISMIC AIRGUN METHOD, APPARATUS AND TOWING SYSTEM

FIELD OF THE INVENTION

The present invention is in the field of seismic energy sources and more particularly relates to large-diameter, cylinder-shuttle seismic airgun method, apparatus and towing system.

BACKGROUND

A technical paper presented by Bill Dragoset at the Offshore Technical Conference in Houston, Tex., May 7–9, 1984, sets forth:

"The results of this experiment . . . lead to two conclusions:

"1) For a given volume of air, the peak amplitude of a signature is roughly proportional to the square root of the port area.

"2) For a given volume of air, the bubble period is independent of port area."

Closely following those "two conclusions" the Dragoset technical paper further states:

"Once a gun designer has decided on the volume of air to release, he should construct the gun to release that air as rapidly as possible. Ports should be as large and shuttle motion as rapid as mechanical constraints allow."

SUMMARY

Large-diameter, cylinder-shuttle (LDCS) seismic airgun method, apparatus and towing system are described and claimed which are believed to change dramatically and advantageously those mechanical constraints inherently previously limiting prior airgun designs.

In accordance with the present invention in certain aspects thereof the shuttle of the seismic airgun is configured as a hollow, elongated cylinder body of revolution having a relatively large diameter with two outwardly-extending, axially-spaced annular flanges. These two annular flanges are an operating flange and a firing flange. There is a large cylindrical axial opening through this body of revolution, which in an illustrative embodiment of the invention being shown has an inside diameter (ID) of 6 inches in diameter. Thus, from a general overall view the body of revolution comprising the shuttle is configured like a cylinder. This cylinder shuttle is configured for providing two outwardly-extending annular operating surfaces on the operating flange facing in opposite axial directions, namely an annular holding surface and an annular triggering surface. Also, the cylinder shuttle is configured for providing an annular firing surface.

The housing of the airgun also is configured like a cylinder having an axial passageway extending through the housing which is shown being sufficiently large for running compressed air hoses and electrical cables through this axial passageway through the housing. As shown this cylinder shape housing has a bridge extending across its axial passageway, and an electrical solenoid firing valve is shown mounted on this bridge for controlling firing of the seismic airgun. The housing has an annular operating chamber and an annular firing chamber with an annular port positioned intermediate these two annular chambers. This annular port is immediately adjacent to the annular firing chamber so that there is minimum axial plus radial distance through which the annular charge of compressed air blasts itself in travelling from the annular firing chamber out through the annular port. All of the compressed air confined in the annular firing chamber of the illustrative LDCS airgun being shown advantageously is contained at a diameter greater than 6 inches, with a median diameter greater than 7 inches. Consequently, this annular charge of compressed air has an initial median circumference greater than 22 inches prior to its sudden discharge. The exit of this annular port in an illustrative embodiment of the invention being shown is between 8 and 10 inches in diameter. Therefore, at the inception of discharge, a toroidal bubble is initially produced having a circumference (circumferential expanse) of more than 25 inches.

As will be explained later, a toroidal bubble has considerably greater surface area than a spherical bubble of equal volume. It is surface area of an expanding bubble of compressed air which provides the interface (interaction) between outwardly expanding compressed air and a surrounding body of water. In other words, the seismic energy transfer from the initially expanding compressed air blasting outwardly into the water may be visualized as all occurring at this interface between air and water.

A present theory for explaining why airguns embodying the invention being described and claimed provide considerably more peak pressure output in a body of water than conventional airguns (of equal firing chamber volume operating at the same pressure of compressed air) is set forth later. Also explained is a present theory for explaining why considerably more bubble damping advantageously occurs in a large diameter torus-shaped bubble produced by a cylinder-shuttle airgun embodying the present invention as compared with lesser bubble damping occurring in bubbles produced by conventional multi-port airguns or conventional sleeve guns having the same firing chamber volume as the present cylinder-shuttle airgun.

In accordance with the present invention in other of its aspects, there is provided a cylinder-shuttle airgun for seismic uses including a cylinder shuttle which is an axially elongated body of revolution concentric about an axis. The cylinder shuttle includes an annular operating flange having an annular holding surface and an annular triggering surface, with the holding and triggering surfaces facing generally in opposite axial directions. The cylinder shuttle also includes an annular firing flange axially spaced away from the annular operating flange and having an annular firing surface facing generally parallel with the axis and facing in the opposite direction from the annular holding surface. The cylinder shuttle has an inwardly-facing cylinder guide surface facing inwardly toward the axis. The cylinder-shape airgun has a housing including annular operating and annular firing chambers both spaced relatively far away from the axis. The housing has an annular port spaced relatively far from the axis located intermediate these two annular chambers. The housing has an outwardly-facing cylinder guide surface facing outwardly from the axis. The inwardly-facing guide surface of the cylinder shuttle is slidably guided by the outwardly-facing guide surface of the housing for guiding axial movement of the cylinder shuttle in either axial direction between closed and open positions. In closed position, the annular firing flange blocks communication between the annular firing chamber and the annular port for confining compressed air in the firing chamber. In open position, the annular firing flange opens communication between the annular firing chamber and the annular port for discharging a sudden blast of compressed air from the firing chamber out through the annular port for initiating a large-circumference torus bubble for producing a high peak pressure in a surrounding body of water. In closed position, the annular operating flange is positioned near an axial end of the annular operating chamber, thereby facing this holding surface into the annular operating chamber for causing pressure of compressed air in this chamber to hold the cylinder shuttle in closed position. In open position, the annular operating flange becomes positioned away from the end of the annular operating chamber for exposing both its annular holding surface and its annular triggering surface to pressure of compressed air in this chamber. The housing includes triggering passages for suddenly applying pressure of compressed air to the annular triggering surface of the operating flange for allowing the cylinder shuttle to move abruptly from closed position toward open position.

In accordance with the present invention in one embodiment of the LDCS airgun, compressed air fed into the annular operating chamber is supplied from this chamber into the annular firing chamber by flowing in an axial direction through a narrow clearance between the outwardly-facing cylindrical guide surface of the housing and the inwardly-facing cylindrical guide surface of the cylinder shuttle.

In accordance with the present invention in further of its aspects the airgun includes a cylinder shuttle with an inwardly-facing cylindrical guide surface having an inside diameter of at least about four inches and being concentric about an axis of the cylinder-shuttle airgun, preferably having an inside diameter of at least about five inches, and more preferably of at least about six inches. The cylinder shuttle has outwardly-extending, axially-spaced annular operating and firing flanges. The cylinder-shuttle airgun includes a housing having an annular operating chamber spaced relatively far from the axis and an annular firing chamber spaced relatively far from the axis. These two annular chambers are axially spaced, with an annular port positioned intermediate them. The annular operating flange is positioned in the annular operating chamber. The housing has an outwardly-facing cylindrical guide surface, and the inwardly-facing cylindrical guide surface of the cylinder shuttle is axially slidable along the former guide surface for guiding movement of the cylinder shuttle in either axial direction (i) for blocking communication between the annular firing chamber and the annular port in a first position of the annular firing flange for confining compressed air in the annular firing chamber and (ii) for opening communication between the annular firing chamber and the annular port in a second position of the annular firing flange for discharging a sudden blast of compressed air from the annular firing chamber out through the annular port into surrounding water for producing seismic pressure waves in the water.

In accordance with the present invention in other aspects thereof, the cylinder shuttle has a cylinder skirt extending axially into the annular firing chamber. This cylinder skirt extends downwardly in an axial direction from the annular firing flange. This skirt is slidably guided by the outwardly-facing guide surface of the housing for guiding axial movement of the cylinder shuttle.

In another aspect, the present invention provides an advantageous seismic energy generation method, the cylinder shuttle of the present cylinder airgun is an axially movable body of revolution of relatively large diameter for discharging compressed air from an annular firing chamber of relatively large diameter blasting outwardly through an annular port of relatively large diameter. The inner surface of the annular firing chamber in a presently preferred embodiment of the invention as shown is more than six inches in diameter, thereby advantageously initially positioning the whole charge of compressed air contained in the annular firing chamber at a median diameter of more than seven inches and a median circumference (circumferential expanse) of more than 22 inches. The annular port is adjacent to the annular firing chamber and has an exit diameter of at least about eight to ten inches for immediately upon firing of the cylinder airgun creating a torus bubble in a body of water wherein the torus bubble initially has a circumferential expanse of more than twenty-five inches and thereby has an initial surface area much greater than the initial surface area of a spherical bubble of the same volume as the torus bubble and much greater than a plurality of spherical bubbles whose total volume is the same as the torus bubble.

Advantageously, the cylinder shuttle in a presently preferred embodiment of the invention as shown travels only about one-half of an inch or even less in moving from fully closed to opening position. Thus the shuttle accelerates and opens quickly, and the compressed air in the annular firing chamber is not allowed to expand much before this compressed air blasts outward through the opening annular port. Since not much expansion is allowed to occur prior to discharge, the compressed air at its initial release has a pressure near to its confined pressure in the annular firing chamber. Moreover, the charge of compressed air in the annular firing chamber is already positioned radially out away from the axis near the radius at which it suddenly will be released through the annular port.

In another advantageous feature of the present invention a cylinder airgun having a cylinder shuttle provides an axial passageway of large diameter extending through the cylinder airgun. This axial passageway has a sufficiently large inside diameter for accommodating a plurality of compressed air hoses and at least one multiconductor electrical cable extending axially through the cylinder airgun in a lineal towing system, whereby the cylinder airgun with its cylinder shuttle may be arranged in encircling coaxial relationship around a plurality of high pressure hoses and at least one multi-conductor electrical cable extending along a line of towed airguns and whereby the axis of the cylinder airgun is readily oriented longitudinally along the line of towed airguns.

Moreover, such axially-aligned coaxially-positioned airguns can be streamlined by tapered fairings on opposite axial ends of each airgun, such fairings being coaxially arranged relative to the hoses and electrical cable or cables extending through them.

The large-diameter, cylinder-shuttle airgun for convenience may be referred to as an "LDCS" airgun. Also, the large-diameter cylinder shuttle may be referred to as an "LDC" shuttle.

For convenience of description with reference to certain FIGURES the terms "up", "upper", "upward", "upwardly", and "down", "lower", "downward" and "downwardly" may be used because the axis of the airgun is shown oriented vertically in the drawings. These "up" or "down" types of terms are not intended as being limiting, since the axis of such airguns can be oriented in any direction relative to the Earth's gravitational field during firing. As shown in FIG. 1, the axes of such airguns often may be oriented generally horizontally for seismic usage in a towed array.

BRIEF DESCRIPTION OF THE DRAWINGS

The invention, together with further objects, features, advantages and aspects thereof, will be more clearly understood from the following detailed description considered in conjunction with the accompanying drawings which are not necessarily drawn to scale with the emphasis instead being placed upon clearly illustrating the principles of the invention. Like reference numerals indicate like parts and components throughout the different views.

The accompanying drawings, which are incorporated in and constitute a part of the specification, illustrate the presently preferred method, apparatus and towing system of the invention and also illustrate alternate arrangements of certain components and, together with the general description set forth above and the detailed description of the preferred embodiments set forth below, serve to explain the principles of the invention. In these drawings:

In FIG. 3 the hose lines, electrical cable and streamlined fairings are omitted for more clearly illustrating operating components of the airgun. Also, in FIG. 3 the solenoid valve is shown mounted differently from its position in FIG. 2; namely it is shown projecting axially upward from the airgun housing.

DETAILED DESCRIPTION OF PREFERRED EMBODIMENTS

Figure 1:
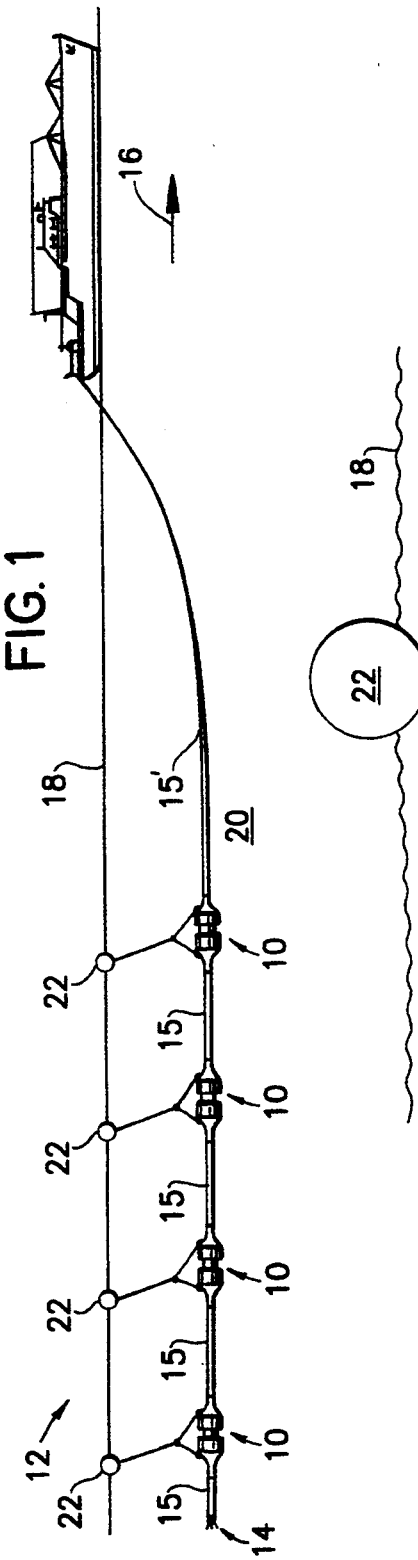
FIG. 1 is an illustration of a large-diameter, cylinder-shuttle airgun towing system embodying the present invention wherein a ship is shown towing a lineal array of airguns of cylinder configuration each encircling the compressed air supply lines and at least one multi-conductor electrical cable extending along the towed line. Only a front end portion of the whole towed array is shown in FIG. 1.
Figure 1A:
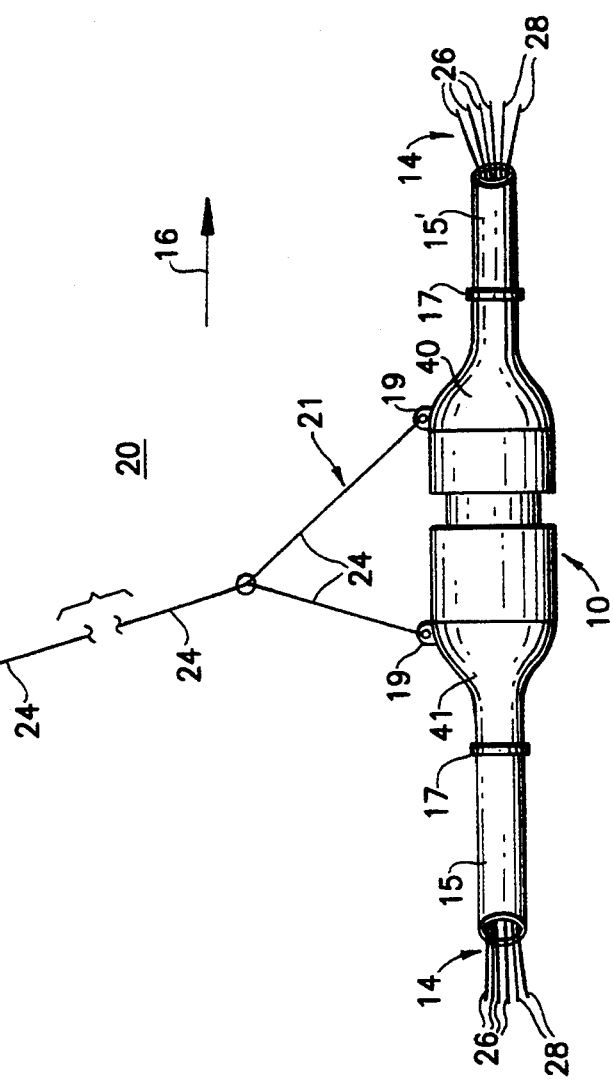
FIG. 1A is an enlargement showing one of the airguns and adjacent components of the towed array.

In FIG. 1 a seismic survey ship is shown towing a lineal array of large-diameter, cylinder-shuttle airguns 10 embodying the present invention. This lineal array 12 includes a bundle 14 of compressed-air hose lines and one or more electrical cables extending along the line of the array shown encased within a protective flexible hose 15 (FIG. 1A). In this towing system, the seismic airguns 10 are arranged generally coaxial with the bundle 14 of compressed air supply hoses and electrical cable(s). In other words the bundle 14 of hoses and cable(s) extends directly through an axial passageway in each of the airguns 10, and the axis of each airgun is aligned generally parallel with the towing direction 16.

The airguns in the array 12 are shown being positioned and supported at a desired depth below the surface 18 of a body of water 20 by means of floats 22 connected by support lines to the respective airguns.

In FIG. 1A, one of the airguns 10 of the array 12 in FIG. 1 is shown enlarged. The airgun 10 has streamlined fairings 40 and 41 connected fore and aft to the housing of the airgun. The bundle 14 of compressed air lines 26 and electrical cables 28 is shown encased within suitable lengths of flexible protective hose sheaths 15. A length of this protective hose sheath 15' extends from the towing ship to the front fairing 40 of the first airgun in the array 12 for example the airgun 10 shown in FIG. 1A. This towing hose sheath 15' is suitably connected to the leading end of the front fairing 40, for example by an encircling hose clamp 17. Then, the lengths of protective hose sheaths 15 extending from an aft fairing 41 of one airgun to a front fairing 40 of the next successive airgun in the array 12 are suitably connected to those fairings by hose clamps 17. The protective flexible hose sheathing 15' and 15 may also comprise a stress member for towing the array 12, for example by incorporating reinforcing stainless steel wires therein in a braided pattern and also in a helical pattern as is indicated in the section of hose sheath shown at left in FIG. 2. A pad eye 19 may be provided on each of the streamlined fairings 40 and 41. A sling 21 of cable or chain 24 is shown connected to these pad eyes 19, and then a supporting length of cable or chain 24 extends up from the sling to the float 22.

Figure 2:
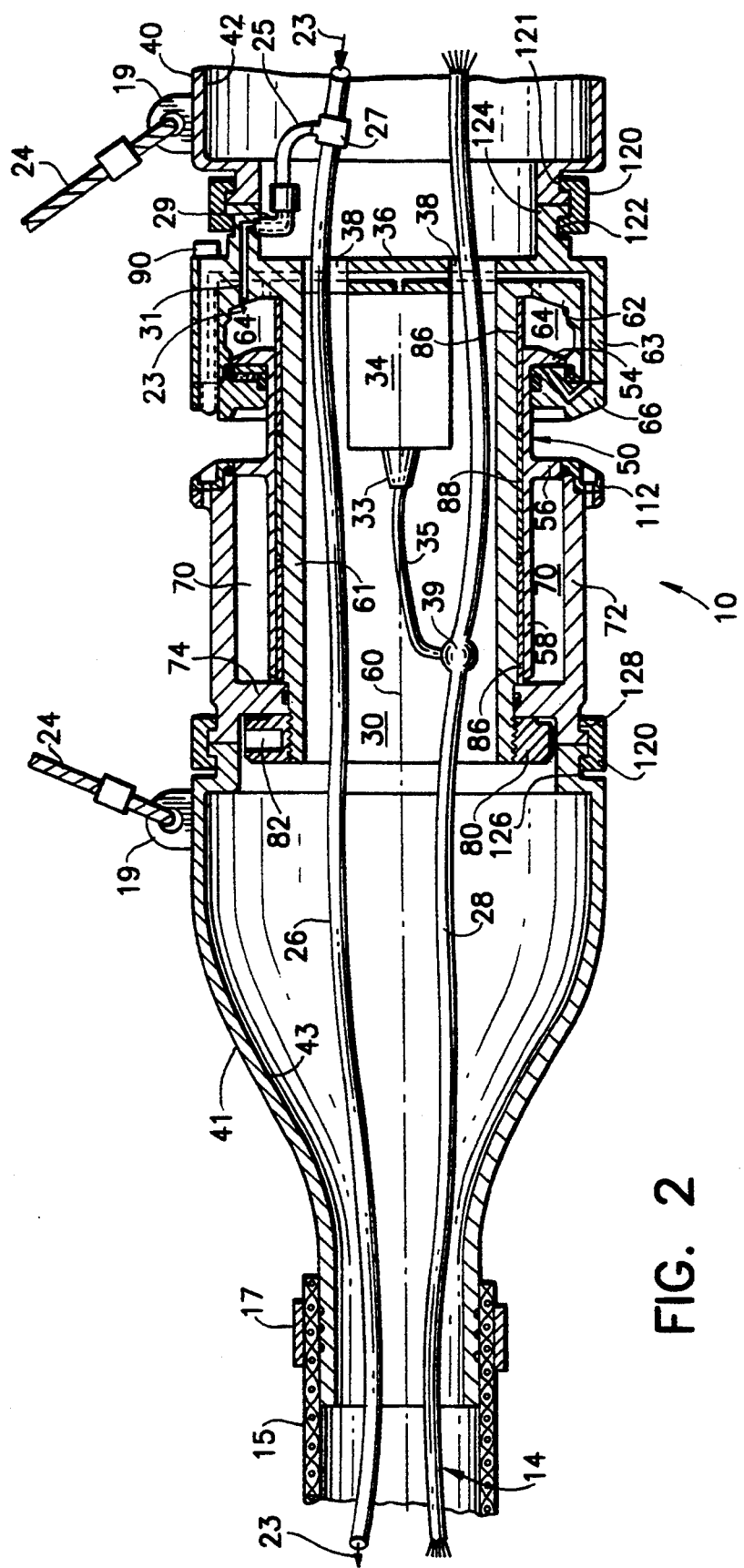
FIG. 2 is a further enlargement of a portion of the towing system of FIG. 1 showing a cylinder airgun in axial section with streamlined fairings mounted on axial ends of the airgun in encircling relationship around compressed air lines (only one is shown) and at least one multi-conductor electrical cable extending through the cylinder airgun. An electrical solenoid firing valve is shown mounted inside of the cylinder airgun for providing a compact configuration of airgun plus solenoid valve and for protecting this solenoid valve by the encircling housing of the airgun.

In FIG. 2 one of the seismic airguns 10 from the array 12 of FIG. 1 is shown further enlarged for illustrating how the bundle 14 of compressed air hose lines 26 and one or more multi-conductor electrical cables 28 extend through an axial passageway 30 within the cylinder shape housing 32 of the airgun 10. This axial passageway 30 has a diameter P of at least three inches and is accessible from both axial ends of the housing 32.

Figure 4:
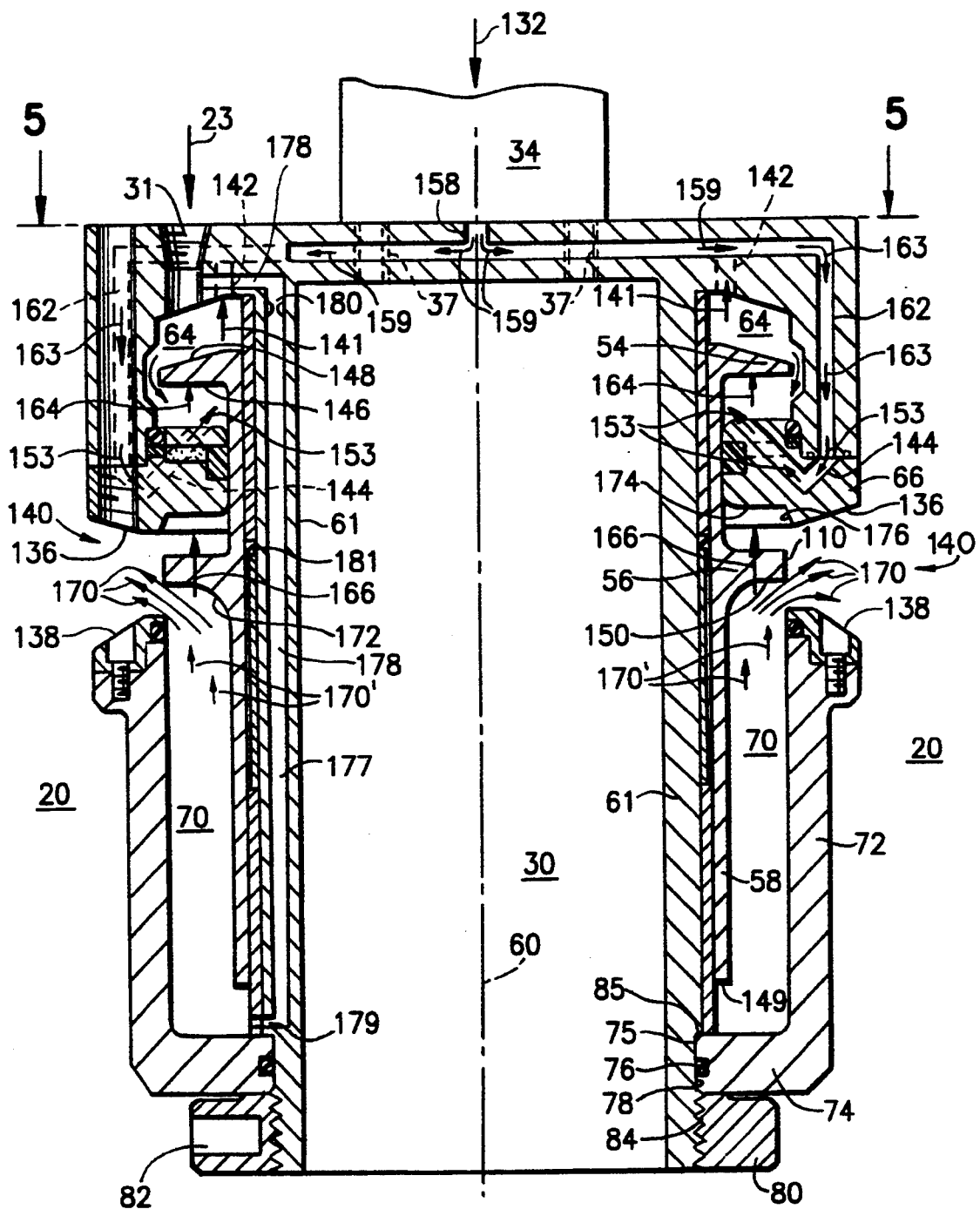
FIG. 4 is a view similar to FIG. 3 for showing the cylinder shuttle axially moving toward to its firing position for suddenly discharging a blast of compressed air from the airgun into a surrounding body of water.
Figure 5:
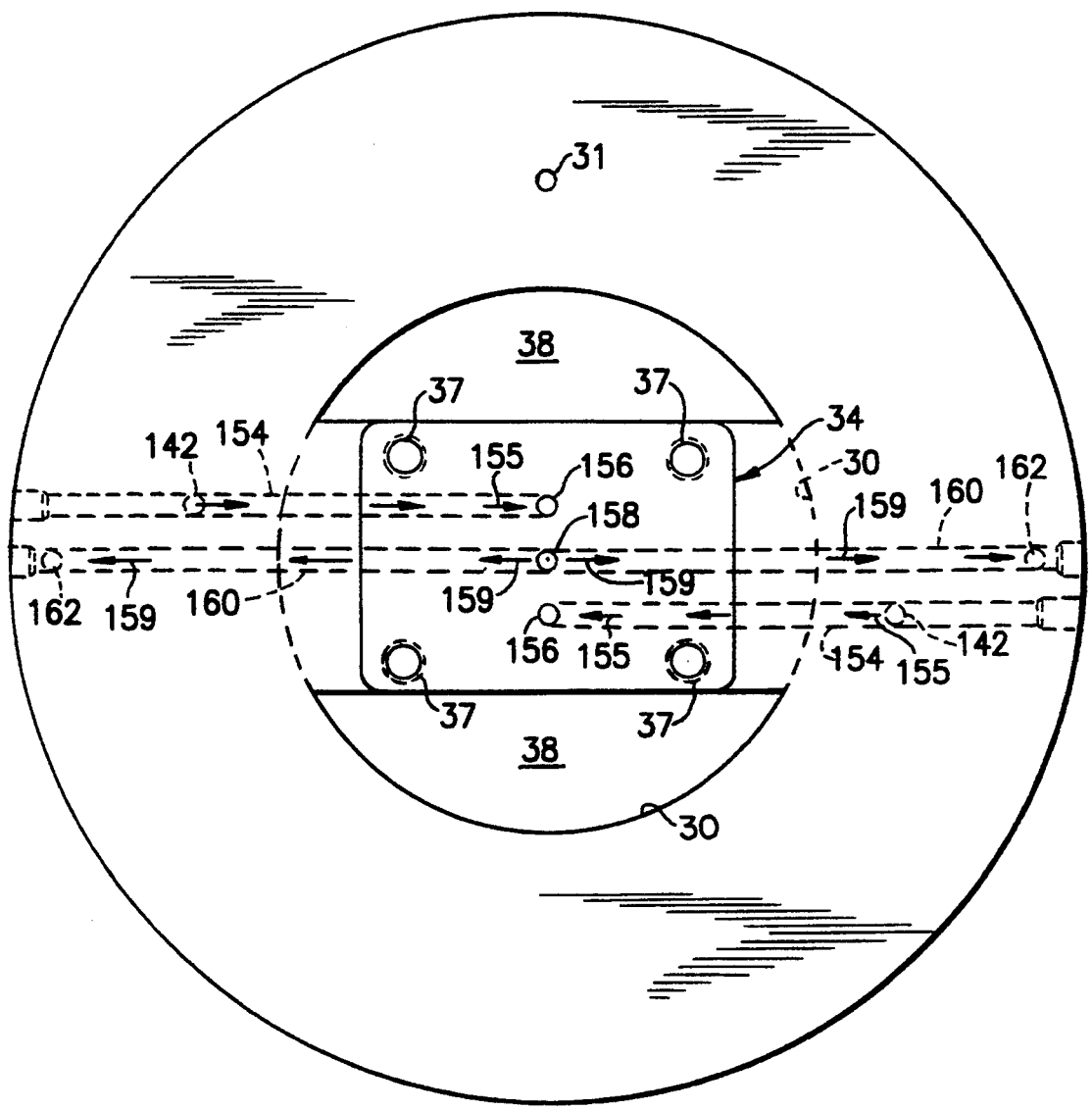
FIG. 5 is a cross-sectional view taken along plane 5-5 in FIGS. 3 and 4 between the solenoid firing valve for the airgun and an axial end of the cylinder airgun. This airgun has a bridge extending across the axial passageway onto which the solenoid firing valve is mounted.

In order to control firing of the airgun 10, an electrically-actuated solenoid valve 34 is suitably mounted on a bridge member 36 of the housing 32, for example by machine screws passed through bore holes (not shown) in the valve 34 and engaged in four threaded sockets 37 (FIG. 3) in the bridge member 36. This bridge member 36 extends diametrically across the axial passageway 30 as shown in FIG. 5, and it includes multiple air passages as will be described later. The bridge is located at one end of the housing 32, as is more clearly seen in FIGS. 3, 4 and 5. The bridge 36 defines two arcuate openings 38 (FIG. 5) communicating with the axial passageway 30, such openings 38 being mirror images of each other located on opposite sides of the bridge. For clarity of illustration, FIG. 2 shows only one compressed air hose line 26 and only one multi-conductor electric cable 28. It will be understood from FIG. 2 that multiple hose lines 26 and one or more cables 28 in a bundle 14 may extend through the axial passageway 30 and may be arranged so that approximately equal numbers of hose lines and cables pass through the respective two openings 38 on opposite sides of bridge member 36.

For feeding compressed air 23 into the airgun 10, a branch hose line 25 may be connected at 27 to one of the axial-pass-through hose lines 26. This branch hose line 25 is shown connected by a fitting 29 to an in-feed passage 31 (please see also FIG. 5) which supplies the compressed air 23 into an annular operating chamber 64 of the airgun 10. The operating chamber 64 will be described in greater detail later. For feeding electrical firing signals to an electrical connector 33 mounted on the solenoid valve 34, a branch cable line 35 may be connected at 39 to one of the axial-pass-through multi-conductor electrical cables 28.

For reducing towing drag, streamlined fairings 40 and 41 as described above may be provided on opposite axial ends of the airgun housing 32. These fairings 40 and 41 may be arranged coaxially with the bundle 14 of hose lines and electric cables so that the bundle 41 extends through tapered axial passageways 42 and 43 defined by the respective fairings 40 and 41, and this bundle 14 of hose lines 26 and electrical cables 28 extends within protective hose sheathing 15' and 15 connected to these fairings as explained with reference to FIG. 1A.

Figure 3:
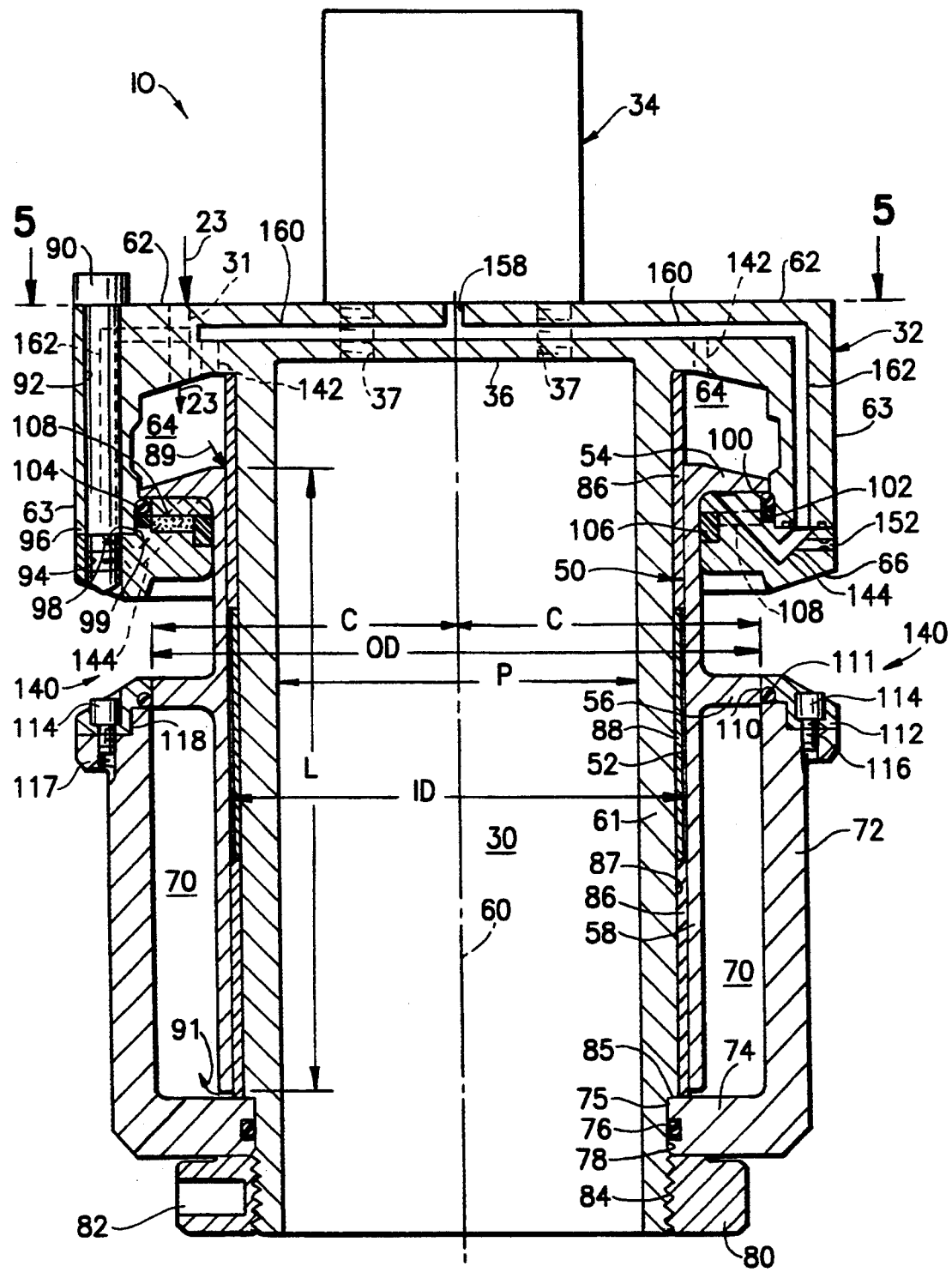
FIG. 3 is a further enlarged axial sectional view of an airgun embodying the present invention.

Inviting attention to FIG. 3, there is shown more clearly as an illustrative example, a presently preferred large-diameter, cylinder-shuttle (LDCS) airgun 10 for seismic uses embodying the present invention. This FIG. 3 drawing is reduced in size compared with the LDCS airgun itself. In this LDCS airgun there is a large-diameter cylinder shuttle 50 having an inside cylindrical guide surface 52 with an inside diameter "ID" for example of about 6 inches and with an axial length "L" for example of about 8 inches, such that the ratio L/ID is, for example, about 1.33.

This large-diameter cylinder (LDC) shuttle 50 is shown with an outwardly-extending, large-diameter, annular operating flange 54 at its upper end. Located below and axially spaced from the operating flange 54 is an outwardly-extending, large-diameter, annular firing flange 56. This firing flange has a firing outside diameter "OD" of about 8 inches. Thus, for example firing OD/ID ratio of this LDC shuttle is no more than about 1.33.

The L to firing OD ratio of this LDC shuttle is about 1 to 1. It is prudent to make the length L of the guiding surface no shorter than will provide an L to firing OD ratio of about 1 to 1 for proper guidance to avoid wobble of the rapidly accelerating shuttle during firing so as to avoid "jitter" in the firing characteristics. It is understood that it is possible to shorten cylinder shuttle length L to a value somewhat less than a one-to-one ratio with respect to the firing OD, but such skimping on the L to OD ratio of the cylinder shuttle is not a preferred expedient.

The substantial relative length L of the cylinder guide surface 52 is shown being provided by axial cylinder skirt 58 extending downwardly from the annular firing flange 56. It is understood that the cylinder skirt 58 can be increased in axial length L, if desired, by increasing the axial length of a firing chamber (to be described soon) into which this cylinder skirt extends for providing an L to firing flange OD ratio which is greater than about 1 to 1 in an effort to achieve somewhat enhanced guidance for the cylinder shuttle 50. However, increasing shuttle length L considerably beyond about 1 to 1 L-to-firing-flange-OD ratio causes an increase in mass of the shuttle 50, thereby reducing its acceleration rate and slowing its opening speed. Thus, about a 1 to 1 ratio (or somewhat more in smaller airguns) between overall length L of the shuttle and OD of its firing flange 56 appears to be a preferred, practical, effective ratio for the illustrative airgun having the present cylinder shuttle and cylinder housing configuration, i.e., this L-to-firing-flange-OD ratio is preferred to be at least about 1 to 1.

It is noted that the cylinder shuttle 50 is a body of revolution concentric around an axis 60. Also, the overall cylinder configuration of the housing 32 is coaxial with this axis 60.

A main component of the cylinder housing 32 is a main inner cylinder structure 61 extending axially of the airgun 10.

At the upper end of this main inner cylinder structure 61 there is an outwardly-extending operating chamber flange top wall 62 with a generally cylindrical sidewall 63 of this operating chamber extending downwardly from the perimeter of this top wall flange 62. Inside this sidewall 63, below the flange top wall 62 there is an annular operating chamber 64. The in-feed passage 31 (FIG. 5) leads directly into this annular operating chamber 64 for thereby supplying compressed air to the whole airgun as will be explained later. In order for this in-feed passage 31 to be seen clearly in FIG. 3, it is shown at the left of the axis 60; in other words, it is shown in FIG. 3 angularly displaced 90° from its actual position shown in FIG. 5. When the airgun 10 is used without the fairings 40 and 41, then a compressed air hose line may be connected by a fitting (not shown) located at the upper end of the in-feed passage 31 for supplying compressed air into the annular operating chamber 64 as is indicated by the arrow 23 in FIG. 3.

The annular operating flange 54 of the large-diameter, cylinder shuttle 50 is located in the annular operating chamber 64. A lower wall of this chamber 64 is provided by an operating seal retainer 66, which is an annular structure comprising two split rings encircling the shuttle 50 and located between its annular operating and firing flanges 54 and 56. This retainer 66 will be described in detail later.

For providing an annular firing chamber 70 (FIG. 3), an interchangeable annular wall member 72 is removably mounted on the lower end of the main inner cylinder structure 61 of the housing 32. For example, as shown, the wall 72 has an inwardly-extending flange wall 74 with a groove in its inturned rim 75 for capturing a static O-ring seal 76 sealing the lower end of the firing chamber 70. For assembling this annular wall 72, 74 on the airgun, the wall rim 75 with its seal 76 is slid onto an external cylinder surface 78 formed on a lower end portion of the main cylinder structure 61. A ring nut 80 having one or more sockets 82 for a spanner wrench is installed on a screw-threaded lower end 84 of the cylinder structure 61 for securing the annular wall 72, 74 in its assembled position as shown in FIG. 3. The flange wall 74 is positively held in its installed axial position by being captured between the ring nut 80 and an external shoulder 85 on the main cylinder structure 61.

For providing guidance for axial motion of the cylinder shuttle 50 a pair of identical sleeve bearings 86 are shown installed fitting snugly around an external cylinder surface 87 of the main inner cylinder structure 61. These sleeve bearings 86 are made of suitable, durable bearing material which require little or no lubrication, for example such as bearing bronze or acetal resin, such as Delrin (Trademark of E. I. du Pont de Nemours & Company). These sleeve bearings 86 are held axially spaced apart by a spacer sleeve 88 formed of suitable material, for example of stainless steel or bronze. The assembly of the two sleeve bearings 86 with their spacer 88 encircling external cylinder surface 87 are held securely in position by being captured between the firing chamber flange wall 74 at the bottom and the housing top wall flange 62 at the top. The inside cylinder shuttle guide surface 52 slides axially along the sleeve bearings 86.

As already explained compressed air 23 is supplied into the annular operating chamber 64 through the in-feed passage 31 (FIGS. 2, 3 and 5). For supplying compressed air into the firing chamber 70 as is shown by arrows 89 and 91 in FIG. 3, the compressed air 23 advantageously flows down through a narrow clearance between the inside cylinder guide surface 52 of the cylinder shuttle 50 and the sleeve bearing and axial spacer assembly 86-88-86.

Inviting attention back to the operating seal retainer 66, this retainer is annular in its overall general configuration. It is formed as two semi-circular halves so that it can be installed in encircling relationship around the cylinder shuttle 50 located between its annular operating and firing flanges 54 and 56. This retainer 66 is secured in position by a plurality of socket-head machine screws 90 (only one is shown) installed through drilled holes 92 in the sidewall 63 of the operating chamber 64. In the large-diameter, cylinder-shuttle airgun embodiment 10 of the invention being shown, there are twelve of these machine screws 90 uniformly spaced around the axis 60 for securing in position the bottom wall (provided by operating seal retainer 66) of the operating chamber 64. These machine screws 90 engage in twelve threaded openings 94 (only one is shown) in the retainer 66. For accurately positioning the two semi-circular halves of the annular retainer 66 in concentricity with axis 60, a lower rim portion 96 of the sidewall 63 provides an inwardly-facing shoulder 98 engaged by an upstanding annular shoulder 99 on the retainer 66.

An operating seal 100 with a backup ring 102 are held up by the annular operating-seal retainer 66 against an inwardly-projecting shoulder 104 of the sidewall 63. This seal 100 and backup ring 102 are formed of material which is sufficiently flexible to be assembled past the perimeter of the operating flange 54, for example such as polyurethane. The retainer 66 also holds an inwardly-acting cylinder shuttle ring seal 106 against the cylinder shuttle 50 between its operating and firing flanges 54 and 56 so that the shuttle 50 can slide upwardly and downwardly in sliding sealing relationship within the ring seal 106. It is again noted that this ring seal 106 is inwardly-acting in contrast to ordinary piston ring seals which are outwardly-acting. A suitable material for this ring seal 106 is Delrin(TM) acetal resin.

Since the annular retainer 66 is formed in two semi-circular halves, there are two axially-extending splits (not shown) between its two halves. These two splits are located on diametrically opposite sides of the axis 60. In order to prevent compressed air from leaking in an axial direction through these two splits, there are two joint seals 108 shown extending radially between the shuttle ring seal 106 and the backup ring 102. These joint seals 108 are nested in slots in respective abutting surfaces of the two halves of the annular retainer 66.

In closed position of the cylinder shuttle 50, outside diameter OD perimeter 110 of its annular firing flange 56 engages an encircling firing seal 111 held in position by a firing-seal retainer 112 mounted at the top of the annular sidewall 72 of the firing chamber 70. A plurality of socket-head machine screws 114 engaging in threaded openings 116 in an upper flange portion 117 of the sidewall 72 secure the firing seal retainer 112 in place. This firing seal retainer 112 is positioned concentrically around the axis 60 by an outwardly-facing shoulder 118 on the sidewall 72.

Inviting attention back to FIG. 2, the front streamlined fairing 40 is shown mounted on the top (or front) of the airgun 10 by a clamp ring 120. Such clamp rings are known in the airgun art. This clamp ring 120 engages in a groove 121 encircling the aft end of the front fairing 40 and in another groove 122 in an upstanding rim 124 on top wall flange 62. The rear streamlined fairing 41 is shown mounted on the aft end of towed airgun 10 by a second clamp ring 120. This latter clamp ring engages a groove 126 in the front end of aft fairing 41 and in another groove 128 encircling removable wall 72 of the firing chamber 70. For illustrative convenience, bridge 36 in FIG. 2 is shown displaced 90° around axis 60, but triggering passages described later are shown in their same positions as in FIGS. 3, 4 and 5.

In the illustrative embodiment of the airgun 10 being illustrated the interchangeable wall 72 provides a volume within firing chamber 70 of about 90 cubic inches.

Figure 3A:
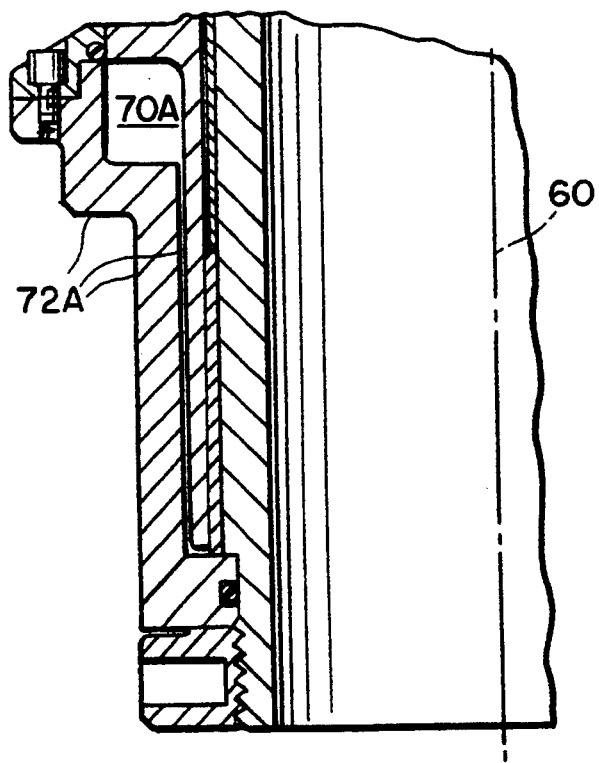
FIGS. 3A and 3B are partial sectional views, based on FIG. 3, showing removable annular walls 72A and 72B, respectively, for providing reduced or increased firing chamber volumes.

By removing this wall 72 and replacing it with a second removable annular wall 72A having a configuration as shown in FIG. 3A, a resulting reduced firing chamber volume is thereby provided within a resulting smaller annular firing chamber 70A of about 20 cubic inches.

Figure 3B:
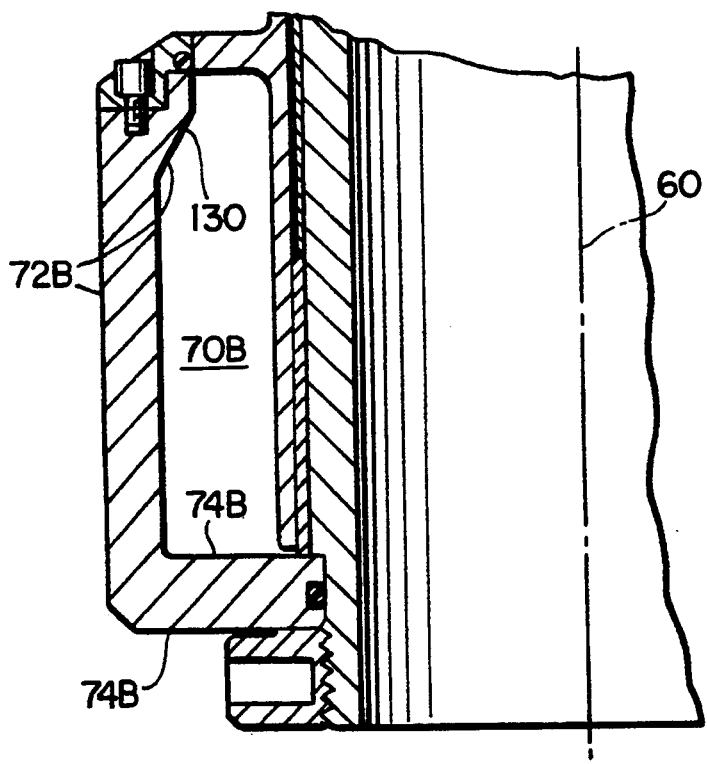

By removing the wall 72 and replacing it with a third removable annular wall 72B having a configuration as shown at 72B, 74B FIG. 3B, a resulting increased firing chamber volume is thereby provided within a resulting larger firing chamber 70B of about 130 cubic inches.

I believe that the present illustrative embodiment of the LDCS airgun 10 being shown is capable of performing successfully with a firing chamber volume up to about 200 cubic inches or more by installing a removable annular wall configured like 72B, but extending out to a larger diameter. It is to be noted that there is a tapered throat configuration indicated at 130 for enlarged diameter annular chamber walls, such as shown at 72B, for minimizing throttling action at the discharge throat of the resultant enlarged-diameter annular firing chamber.

Up to the present time the presently preferred illustrative embodiment of the LDCS airgun 10 has been experimentally tested only with a 90 cubic inch firing chamber 70 as shown in full section in FIG. 3. This LDCS airgun 10 fired with compressed air 23 at 2,000 pounds per square inch (psi) from the 90 cubic inch firing chamber 70 has demonstrated outstandingly superior performance, as will be explained later.

In order to fire the LDCS airgun 10 an electrical firing signal pulse (indicated by an arrow 132 in FIG. 4) is appropriately sent to the solenoid firing valve 34, for example by being sent from the towing ship along an electrical cable 26. In response to this firing signal pulse 132 the solenoid valve 34 (FIG. 4) quickly opens for triggering firing of the airgun as shown in FIG. 4. The operating seal retainer 66 and the firing seal retainer define between them an annular discharge port 140 extending uninterrupted for 360° around the axis 60. The opposed surfaces 136 and 138 of the respective retainers 66 and 112 are flared outwardly for providing a flared annular discharge port 140.

Prior to triggering the opening of the solenoid valve 34, a charge of compressed air is supplied into and is retained in the firing chamber 70 or 70A or 70B, because the operating flange 54 is slightly larger in outside diameter than the firing flange 56. For example, in the illustrative embodiment of the LDCS airgun 10 being shown, the outside diameter of the annular operating flange 54 is 8.25 inches, whereas the OD of the annular firing flange 56 is 8.00 inches. In other words, the annular operating flange outside diameter is about 103% of the OD of the firing flange 56, thereby providing an overbalancing holding advantage of about three percent, as will be explained. Consequently, prior to firing a downward-acting holding force of compressed air pressure within the operating chamber 64 pushing down on an upper annular holding surface 148 of the operating flange 54 overbalances by about 3% an upward-acting opening force of compressed air pressure within the firing chamber 70 or 70A or 70B pushing up on the cylinder shuttle 50. This upward-acting force occurs at the lower end surface 149 of the cylinder skirt 58 and also on the lower (firing) surface 150 of the firing flange 54. In closed position of the cylinder shuttle 50, the operating seal 100 prevents compressed air within the operating chamber 64 from communicating with the trigger (lower) surface 146 of the annular operating flange 54. In the event any slight amount of compressed air might leak past the operating seal 100, a bleed passage 152 in the operating seal retainer 66 with a small orifice allows any such leaked air to escape, thereby preventing any premature triggering of firing.

Upon quick opening of the solenoid valve 34, a sudden trigger flow of compressed air (shown by two arrows 141 in FIG. 4) exits from diametrically opposite regions of the annular operating chamber 64 through two trigger passages 142 (FIGS. 4 and 5) thence passing in two parallel, dynamically-balanced flows through a sequence of trigger passages arranged in dynamically-balanced parallel-flow relationship (to be described shortly) leading to two final triggering passages 144 (FIG. 4) located in diametrically oppositely located portions of the operating seal retainer 66 communicating with a lower surface (triggering surface) 146 of the operating flange 54. The sequence of flows through two triggering passages of exactly the same length acting in parallel, thereby advantageously guarantees simultaneous arrival of trigger air 153 to diametrically opposite areas of annular trigger surface 146 of operating flange 54, thus providing dynamically-balanced triggering force 164 (FIG. 4) on the operating flange 54 of the cylinder shuttle 50. The two triggering flows acting in parallel commence with two initial flows 141 (FIG. 4) into two trigger passages 142 (FIGS. 4 and 5) for providing two simultaneous final trigger flows shown by two arrows 153 (FIG. 4) travelling through two final trigger passages 144. This parallel-flow sequence is traced as follows: from annular operating chamber 64, two flow arrows 141 through two passages 142 into and along two passages 154 (FIG. 5) indicated by flow arrows 155 leading inwardly to two ports 156 (FIG. 5) communicating with interior valve mechanism as known in the art within firing solenoid valve 34. Since this valve 34 is now suddenly open, it provides sudden communication between the two ports 156 and an axial port 158 (FIGS. 4 and 5) providing two diverging flows 159 into and along two passages 160 (FIGS. 4 and 5) leading outwardly and thence into two axially extending passages 162 as shown by flow arrows 163 which provide the two simultaneous trigger flows 153 already described issuing through the two final trigger passages 144.

The two simultaneous triggering flows 153 (FIG. 4) coming into contact with two diametrically opposite areas of the annular trigger surface 146 of the annular operating flange 54 provides a balanced upward force 164 (FIG. 4) which suddenly overbalances the approximate 3% advantage of the downward-acting holding force acting on the annular holding surface 148, relative to the upward-acting firing force acting on the skirt end surface 149 plus acting on the annular firing surface 150. This sudden overbalancing of the holding force causes the cylinder shuttle 50 to accelerate upwardly very fast and move very fast as shown by arrows 166 (FIG. 4) toward its full open position, whereby a powerful blast 170 of compressed air is suddenly discharged out through the annular discharge port 140.

It is noted that flows 170' within the firing chamber 70 advantageously need not travel through any restrictive "throat" passage or passageways intervening between the firing chamber 70 and the discharge port 140. Moreover, in the illustrative embodiment of the LDCS airgun 10 being shown, the firing chamber 70 has an effective width in its circumferential direction of $\pi$ times its mean diameter of more than 7 inches, which provides more than 22 inches of effective circumferential width. The firing chamber 70 also has a uniform radial width of 0.80 of an inch, thereby advantageously providing a single unrestricted, undivided, uniform discharge flow channel having a cross-sectional area of more than 22 inches $\times$ 0.80 of an inch, which amounts to more than 17.6 square inches of wide-open, uniform-width, unobstructed flow channel for enabling very sudden and powerful discharge flow 170' into blast 170.

For facilitating the blast flow 170, the firing surface 150 of the firing flange 56 may be provided with a transitional curvature 172 (FIG. 4) of relatively large radius, which tends to merge with the upper outwardly flaring surface 136 of the discharge port 140, thereby diminishing air flow turbulence and hence diminishing turbulent heat-loss for preserving more available energy of the compressed air to be active in producing an explosive-like, powerful blast 170.

An annular water-dash-pot moat 174 is provided in the lower surface of the operating seal retainer 66 having an encircling throttling surface 176 of truncated conical shape which slopes inwardly upwardly so as to converge with the perimeter 110 of the firing flange 56 for thereby providing a water-dash-pot action by ambient water 20 becoming trapped within the annular damping moat 174 above the rising operating annular flange 54 and issuing through the progressively narrowing converging annular clearance between the upwardly moving perimeter 110 and the truncated conical surface 176.

An alternative embodiment is shown in FIG. 4 of means for supplying compressed air 23 from the annular operating chamber 64 to the annular firing chamber 70 comprising an axially-extending passage 177 drilled in the main cylinder structure 61 of the housing with connecting radial passages 178 and 179 providing communication between the in-feed passage 31 and the annular operating chamber 64 and the firing chamber 70. A restriction orifice 180 in passage 177 prevents overly-rapid re-charging of the firing chamber 70 following discharge. A seal 181 (FIG. 4) prevents leakage of compressed air past bearing sleeve and spacer assembly 86-88-86.

Figure 6A:
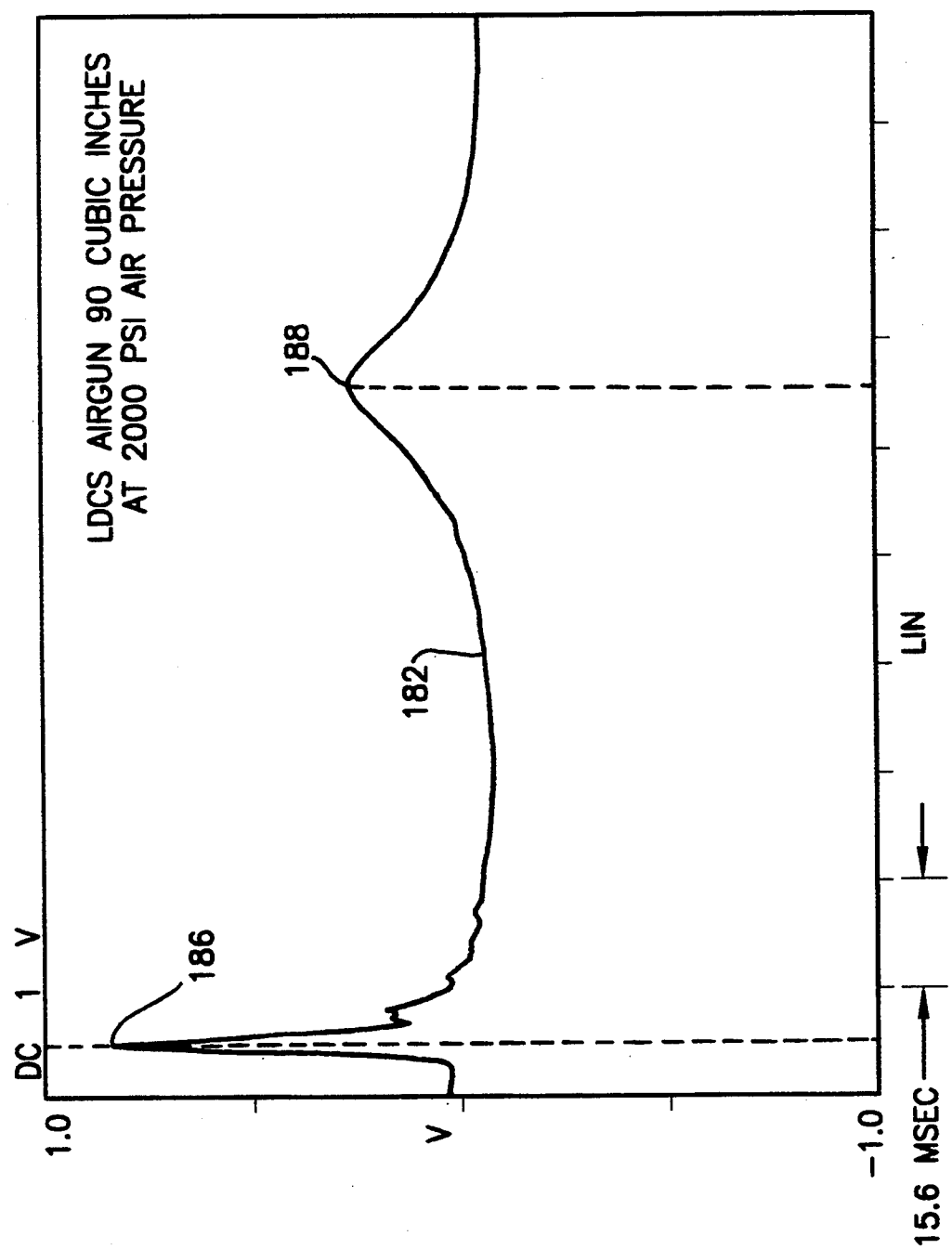
FIGS. 6A and 6B are voltage traces for comparing performance of an LDCS airgun 10 with a standard four-port airgun.

FIG. 6A shows a printout of a voltage signal produced by firing an LDCS airgun 10 having a firing chamber 70 of 90 cubic inches charged with compressed air at 2,000 psi. The airgun 10 was discharged into a body of water. A near-field hydrophone in the body of water with suitable electronic equipment produced the voltage trace 182 in FIG. 6A.

Figure 6B:
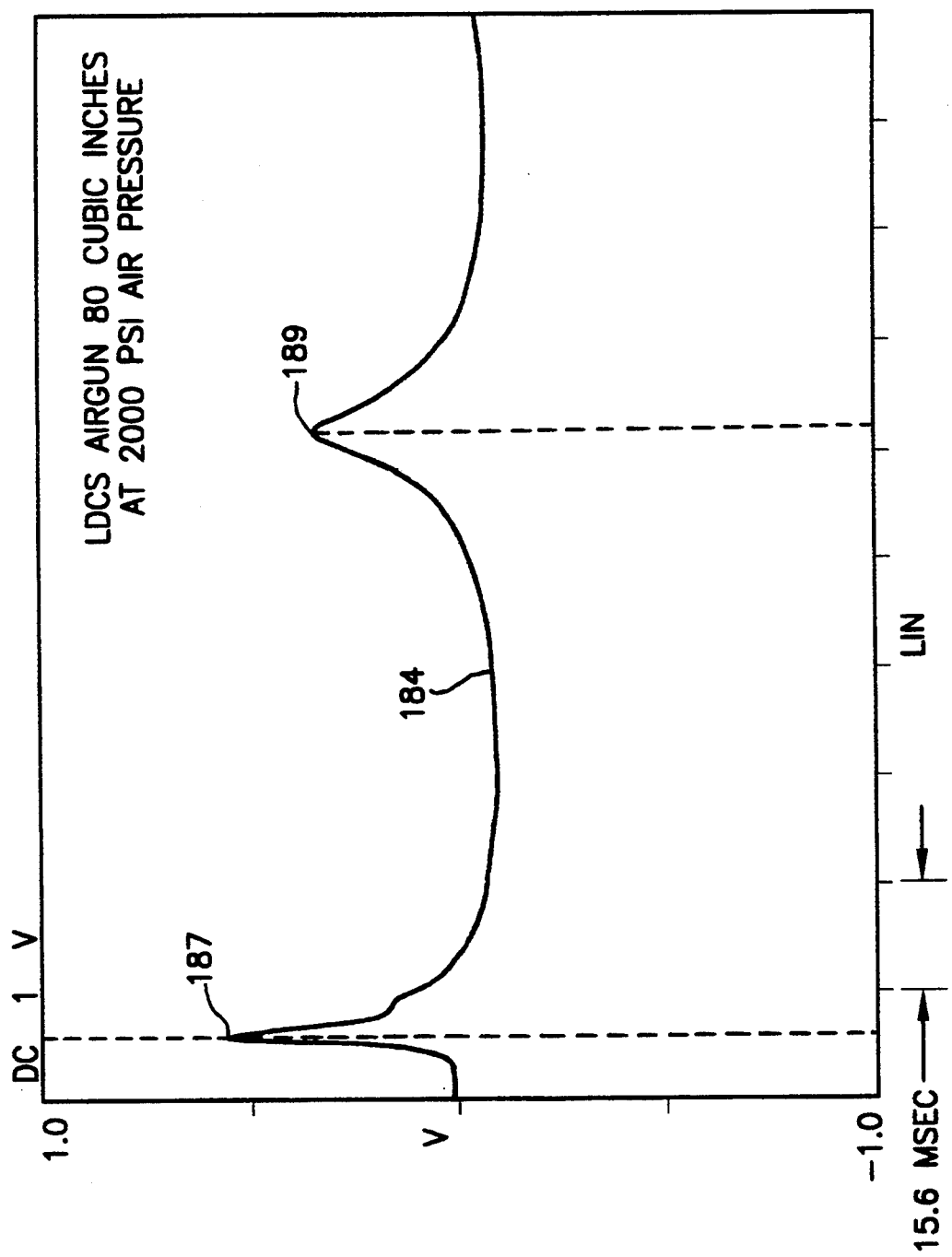

FIG. 6B shows a printout of a voltage signal produced by firing a standard four-port airgun (Model 1900C of Bolt Technology Corporation) having a firing chamber volume of 80 cubic inches charged with compressed air at 2,000 cubic inches. The standard airgun was discharged into the same body of water at the same place and at the same depth. An identical near-field hydrophone at the same test position was used for producing FIG. 6A with the same electronic equipment which produced the voltage trace 184 of FIG. 6B.

Since the standard airgun tested for producing the trace 184 in FIG. 6B had an 80 cubic inch firing chamber, whereas the LDCS airgun had a firing chamber 70 of 90 cubic inches, a normalizing correction factor (multiplying factor) of 1.06 (which is based upon years of airgun testing experience) is applied to the 80 cubic inch standard airgun to raise its imputed performance to that which would have been obtained if it had had a 90 cubic inch firing chamber: A wideband amplitude comparison on such a 1.06 normalized basis for the standard airgun shows the amplitude of the pressure peak voltage 186 (FIG. 6A) produced by the LDCS airgun 10 in the body of water to be 1.45 that of the pressure peak voltage 187 produced by the standard airgun, i.e., there is a 45% enhanced performance. An amplitude comparison using a bandpass of zero to 125 Hz on such a 1.06 normalized basis for the standard airgun shows the amplitude of the pressure peak produced by the LDCS airgun 10 in the body of water to be 1.25 that of the standard airgun, i.e., there is a 25% enhanced performance.

On a normalized performance basis, the Peak-to-Bubble pressure ratio ("PBR") of the LDCS airgun 10 (similar to peak 186 compared to peak 188 in FIG. 6A, except using a bandpass of zero to 125 Hz) shows a PBR of 2.27, whereas the standard airgun (similar to peak 187 compared to peak 189 in FIG. 6B, except using the same bandpass of zero to 125 Hz) shows a PBR of 1.18. Dividing the PBR of 2.27 by the PBR of 1.18 shows an enhancement of 1.92, i.e., a 92% enhancement for the LDCS airgun 10.

Figure 7:
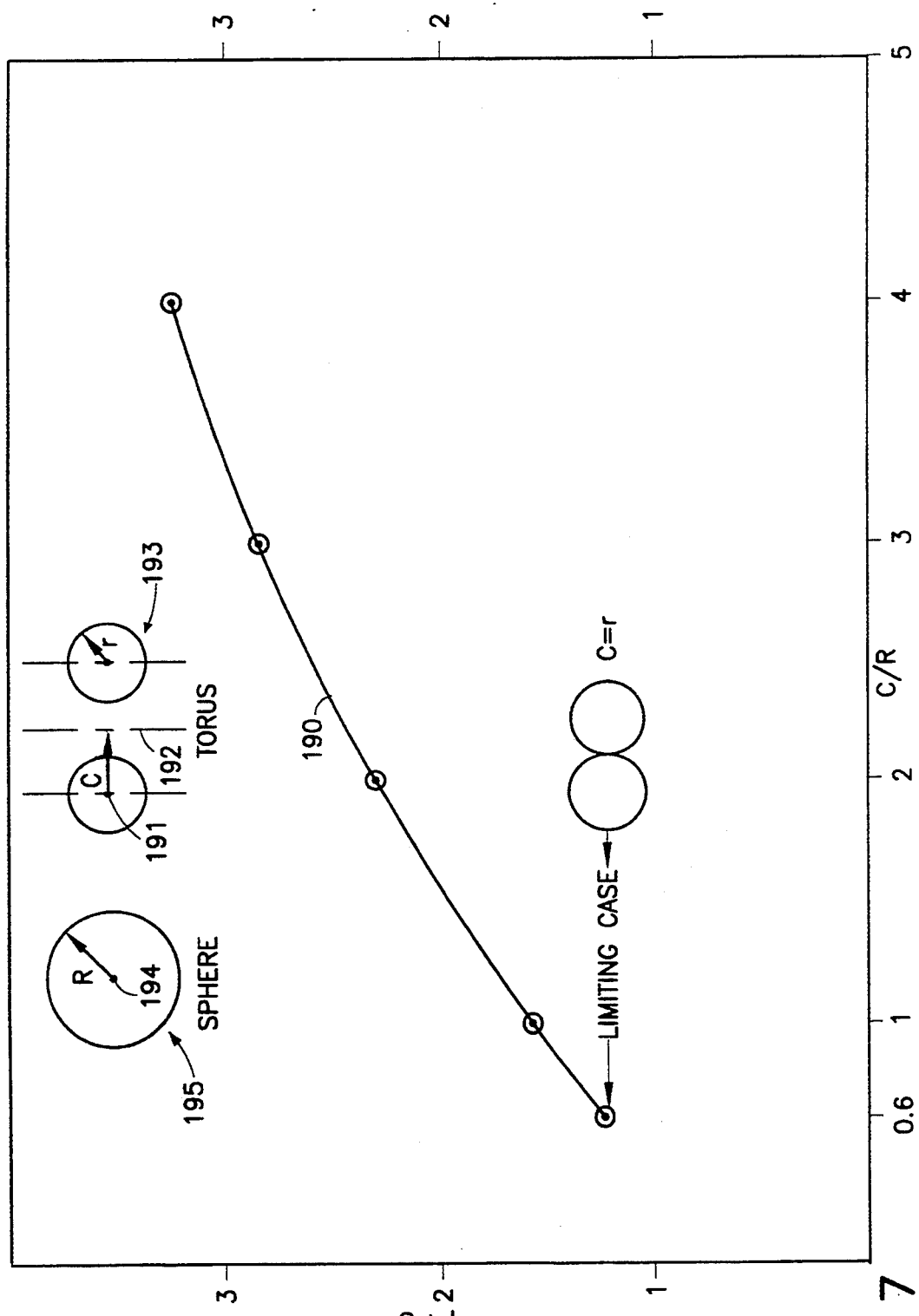
FIG. 7 is a plot of the ratio of surface area of a torus to surface area of a sphere of equal volume. This plot is used for explaining surface area relationships between a torus and a sphere of equal volume when the diameter (and circumferential expanse) of the torus are progressively increased.

In FIG. 7 is shown a plot 190 of the ratio of surface area of a torus to surface area of a sphere of equal volume. The horizontal values of this plot are the ratio C/R, wherein "C" is the radial distance from a center point 191 of the circular cross section of the Torus to the axis of revolution 192 of the Torus 193 shown in an axial section taken on a plane in which lies the axis 192 and wherein "R" is the radius of a Sphere 195 from its center point 194 to its surface. The vertical values of this plot are the ratio of surface area of the Torus $S_t$ to surface area of the Sphere $S_s$.

The formula for the surface area of a Sphere is:

$$S_s = 4\pi R^2 \qquad (1)$$

The formula for the surface area of a Torus is:

$$S_t = 4\pi^2 Cr \qquad (2)$$

The formula for the volume of a Sphere is:

$$V_s = 4/3\pi R^3 \qquad (3)$$

The formula for the volume of a Torus is:

$$V_t = 2\pi^2 Cr^2 \qquad (4)$$

The transfer of energy from an expanding bubble of compressed air into a surrounding body of water 20 is assumed to occur entirely at the surface of the bubble, which is the interface between expanding air and water. Assuming that a Torus bubble is initiated at an instant soon after the firing flange perimeter 110 (FIG. 3) separates from the firing seal 111, then the value of "C" for the LDCS airgun 10 as seen in FIG. 3 is approximately one-half of "OD". In other words, OD approximately equals 2C.

From a comparison of formulas (1) and (2) above, it can be seen on the one hand that a Torus bubble which is initiated at a relatively large radial value of "C" almost instantaneously achieves a significant surface area at such a small radius, since $S_t$ is a function of the variables C times r. Consequently, the relatively large C multiplied by a small r produces a significant Torus surface area $S_t$, thereby providing a significant area of interface for effective transfer of seismic energy into the water. Moreover, since "r" is relatively small not much expansion has yet occurred. So, the relatively young Torus bubble is still nearly at its initial confined pressure of 2,000 psi, and thus it is able to push forcefully against a significant interface with the surrounding water for achieving a quick rise to a high peak output pressure.

On the other hand, for generalized comparison with a Torus bubble, a Sphere bubble may be assumed to be initiated at a centralized position 194 (FIG. 7). In the case of a standard four-port airgun, four Sphere bubbles may be assumed to be initiated at four such centralized positions spaced 90° apart around the circumference of the standard airgun. Thus, a Sphere bubble at a small radius R does not almost instantaneously achieve a significant surface area at such a small radius R, since $S_s$ is a function of the variable R times R. Consequently, the relatively small R multiplied by another small R does not produce a significant Sphere surface area $S_s$, thereby providing, a less significant of interface causing less effective transfer of seismic energy into the water. In order to achieve a significant area, R must considerably increase, resulting in considerable expansion of a Sphere bubble with considerable decrease of internal pressure from the initial confined pressure of 2,000 psi. So, the relatively young Sphere bubble is not so effective in transferring seismic energy into the water as the relatively young, large-C Torus bubble. Such a large-C Torus bubble is achieved by this LDCS airgun 10 having a firing flange perimeter OD of 8 inches for providing an initial C of about 4 inches. By the time that the Sphere bubble (or four Sphere bubbles) has (have) expanded to achieve a significant surface area, its (their) internal pressure has declined such that it (they) is (are) not so effective in transferring seismic energy into the water.

In summary, a young Torus bubble of large radius C (herein called a "large-C Torus bubble") has marked advantage over a Sphere bubble and over a plurality of Sphere bubbles for transferring seismic energy into the water.

In regard to bubble pulse damping, an advantageous converse Torus bubble action is envisioned. As the Torus bubble is approaching its full expansion, its surface area is relatively large but its internal pressure is low, thus ambient water pressure begins to obtain an advantage in resisting further bubble expansion, because ambient water pressure is effectively counter-attacking against the expanding low-pressure Torus bubble over a relatively large interface area for opposing and for damping further expansion of the Torus bubble. Thus, significant bubble damping occurs, thereby mitigating the bubble pulse 188 of a large-C Torus bubble.

In distinction to this advantageous bubble damping effect of a large-C Torus bubble, i.e., having been initiated at a large C, the dynamics of a Sphere bubble tend to produce a large bubble pulse. As the Sphere bubble is approaching its full expansion, its surface area is not nearly so large as the large-C Torus of equal volume. Thus, even though its internal pressure is low, ambient water does not yet begin to obtain such a counter-attacking advantage in resisting farther final expansion of the Sphere bubble, because ambient water pressure has less available interface area against which to offer resistance against further Sphere bubble expansion. Consequently, there is much less bubble damping, and when the Sphere bubble collapses, the collapsing begins at a large radius R, thereby producing an undesirably large Peak-to-Bubble pulse ratio upon its full collapse.

Thus, it appears advantageous to construct LDCS airguns having a firing flange OD of much more than eight inches. For example LDCS airguns having a firing flange OD of twelve inches or of fourteen inches or of two feet or of three feet appear to be feasible, because each such airgun can be towed with streamlined fairings fore and aft in concentric coaxial relationship around the associated hose lines and electrical cables. Moreover, the encircling hose sheath 15 and 15' protects these hose lines and electrical cables from deleterious "strumming" (vibrating) effects which can occur when a bare hose line or electric cable is towed through the water.

Since other changes and modifications varied to fit particular seismic operating requirements and environments will be recognized by those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A cylinder-shuttle airgun for seismic uses comprising:
   a cylinder shuttle having an elongated hollow cylindrical body having an axis;
   an operating flange connected to said elongated hollow cylindrical body;
   said operating flange being generally annular in configuration and encircling said elongated hollow cylindrical body and projecting outwardly therefrom;
   a firing flange connected to said elongated hollow cylindrical body;
   said firing flange being generally annular in configuration and encircling said elongated hollow cylindrical body and projecting outwardly therefrom;
   said annular firing flange being spaced away from said annular operating flange in an axial direction;
   a housing;
   said housing having an annular operating chamber spaced radially away from said axis;
   said annular operating flange being in said annular operating chamber;
   said housing having an annular firing chamber spaced radially away from said axis;
   said housing having port means extending around said axis and being located intermediate said annular operating chamber and said annular firing chamber;
   said housing having axially elongated guide means for guiding movement of said cylinder shuttle in either axial direction parallel with said axis for blocking communication between said annular firing chamber and said port means in a first position of said annular firing flange for confining compressed air in said annular firing chamber and for opening communication between said annular firing chamber and said port means in a second position of said annular firing flange for discharging compressed air from said annular firing chamber out through said port means
   said elongated hollow cylindrical body of said shuttle having an elongated cylindrical skirt;
   said elongated cylindrical skirt extending in a first axial direction from said annular firing flange; and
   said first axial direction being opposite to a second axial direction from said annular firing flange to said annular operating flange.

2. A cylinder-shuttle airgun as claimed in claim 1, in which:
   said axially elongated guide means is hollow and has a hollow cylindrical configuration extending parallel with said axis;
   said hollow cylindrical configuration is concentric around said axis; and
   said hollow cylindrical configuration has an inside diameter of at least three inches.

3. A cylinder-shuttle airgun as claimed in claim 1, in which: said elongated cylindrical skirt of said shuttle extends into said annular firing chamber.

4. A cylinder-shuttle airgun as claimed in claim 3, in which:
   said annular firing chamber encircles said elongated cylindrical skirt.

5. A cylinder-shuttle airgun as claimed in claim 2, in which:
said elongated cylindrical skirt extends into said annular firing chamber; and
said annular firing chamber encircles said elongated cylindrical skirt.

6. A cylinder-shuttle airgun as claimed in claim 1, in which:
said elongated hollow cylindrical body of said shuttle has first and second ends axially spaced from each other;
said annular operating flange is connected to said elongated hollow cylindrical body at said first axial end thereof;
said annular firing flange is connected to said elongated hollow cylindrical body at a region of said elongated hollow cylindrical body intermediate said first and second ends thereof; and
said elongated cylindrical skirt comprises a portion of said elongated hollow cylindrical body between said intermediate region and said second end thereof.

7. A cylinder-shuttle airgun as claimed in claim 4, in which:
said housing includes a removable interchangeable wall encircling said annular firing chamber;
said interchangeable wall also encircles said elongated cylindrical skirt; and
said interchangeable wall is interchangeable with other interchangeable walls of various configurations for changing volumes of said annular firing chamber.

8. A cylinder-shuttle airgun as claimed in claim 1, in which:
said elongated hollow cylindrical body of said cylinder shuttle has a bore extending through said cylinder shuttle having an inside diameter of at least about four inches; and
said annular firing flange has an outside diameter of at least about six inches.

9. A cylinder-shuttle airgun as claimed in claim 1, in which:
said elongated hollow cylindrical body of said cylinder shuttle has a bore extending through said cylinder shuttle having an inside diameter ID of at least about six inches;
said annular firing flange has an outside diameter OD; and
a ratio of said OD to said ID is no more than about 1.33.

10. A cylinder-shuttle airgun as claimed in claim 1, in which:
said annular firing flange has an outside diameter OD;
said cylinder shuttle has an axial length L; and
the ratio of said axial length L to said outside diameter OD of said firing flange is about 1 to 1.

11. A cylinder-shuttle airgun as claimed in claim 1, in which:
said housing has air supply passage means communicating with said annular operating chamber for feeding compressed air into said annular operating chamber; and
said annular operating chamber communicates with said annular firing chamber through a narrow clearance between said axially elongated guide means and said cylinder shuttle for supplying compressed air from said annular operating chamber into said annular firing chamber for charging said annular firing chamber with compressed air prior to firing the cylinder-shuttle airgun and for recharging said annular firing chamber with compressed air after firing.

12. A cylinder-shuttle airgun as claimed in claim 1, wherein said airgun is adapted for convenient arrangement among a plurality of such airguns in a towing array for marine seismic use and wherein the towing array has one or more compressed air supply hoses extending along the array and has at least one electrical cable extending along the array, in which:
said housing of the cylinder-shuttle airgun has an axial passageway extending therethrough;
said axial passageway is concentric with respect to said axis of said elongated cylindrical body of the shuttle;
said axial passageway is accessible from each end thereof;
said elongated cylindrical body of the shuttle has an inside diameter which is larger than the diameter of said axial passageway; and
said axial passageway is sufficiently large in diameter for passing therethrough at least one compressed air supply hose and at least one electrical cable extending axially through both the housing and the shuttle of the airgun.

13. A cylinder-shuttle airgun as claimed in claim 12, in which:
said axial passageway extending through said housing has a diameter of at least three inches.

14. A cylinder-shuttle airgun as claimed in claim 12, further comprising:
a bridge in said housing extending diametrically across said axial passageway;
said bridge having air supply passage means communicating with said annular operating chamber; and
said bridge is adapted to have an electrical solenoid firing valve mounted thereon in communication with said air supply passage means.

15. A cylinder-shuttle airgun as claimed in claim 14, in which:
said bridge is adapted to have the electrical solenoid firing valve mounted thereon in a location wherein the electrical solenoid firing valve is positioned entirely within the axial passageway, thereby being protectively encircled by said housing of the cylinder-shuttle airgun.

16. A cylinder-shuttle airgun as claimed in claim 12, in which:
at least one streamlined fairing extends in an axial direction from said housing for encircling one or more compressed air hoses and at least one electrical cable extending axially through said fairing and axially through both the housing and the shuttle of the airgun for facilitating towing of the airgun in an axial direction in an array of such airguns.

17. A marine seismic array towing system comprising:
at least two cylindrical shaped airguns each having a housing with an axis and each having an axial passage extending through the housing concentric about said axis;
each axial passageway having an inside diameter;
each airgun having a shuttle with an elongated hollow cylindrical body concentric about said axis;
said elongated hollow cylindrical body of the shuttle having an inside diameter larger than said inside diameter of said axial passageway;

said axial passageway being sufficiently large to carry at least one compressed air hose and at least one electrical cable extending axially through both the housing and the shuttle of the airgun;

each of said airguns having a front and a rear streamlined fairing concentrically attached to respective front and rear ends of the housing of each of said airguns;

each of said streamlined fairing having a through-passageway therein sufficiently large to pass therethrough at least one compressed air hose and at least one electrical cable;

each streamlined fairing having attached to its end remote from its airgun a length of hose of sufficient inside bore to carry at least one compressed air hose and at least one electrical cable extending longitudinally through the bore of such length of hose;

each such length of hose serving both as a protective conduit for such compressed air hose and such electrical cable and also serving as a stress member for carrying towing stress for towing the seismic array; and at least one compressed air hose and at least one electrical cable extending from a towing ship through the bore of a first of such lengths of hose and through the through-passageway of the front streamlined fairing on a first airgun in said array and through the axial passage through both the housing and the shuttle of said first airgun and through the through-passageway of the rear streamlined fairing on said first airgun and through the bore of a next length of hose in said array towing system extending from the rear streamlined fairing on the first airgun to a front streamlined fairing on the next airgun in said array towing system and through the through-passageway of said front streamlined fairing on said next airgun and through the axial passage through both the housing and the shuttle of said next airgun and through the through-passageway of a rear streamlined fairing on said next airgun and through the bore of a length of hose extending from the rear streamlined fairing of said next airgun.

18. A cylinder shuttle for use in a seismic airgun comprising:
a cylinder body of revolution concentric with an axis and having an annular operating flange projecting outwardly therefrom from an upper end of the cylinder;
said cylinder having an inside diameter ID;
said cylinder having an annular firing flange projecting outwardly therefrom from an intermediate portion of said cylinder;
said annular firing flange being axially spaced from said annular operating flange;
said cylinder extending down below said firing flange forming a cylinder skirt;
said annular firing flange having a perimeter with an outside diameter OD; and
the ratio of OD to ID being no more than about 1.33.

19. A cylinder shuttle for use in a seismic airgun as claimed in claim 18, in which:
said cylinder has an inwardly-facing cylinder surface;
said inwardly-facing cylinder surface is at least about 6 inches in diameter; and
said annular firing flange has a perimeter with an outside diameter OD of at least about 8 inches.

20. A cylinder shuttle for use in a seismic airgun as claimed in claim 18, in which:
said annular firing flange has a perimeter with an outside diameter OD of at least about twelve inches.

21. A cylindrical housing for a seismic airgun comprising:
a main inner cylinder structure having an axial passageway extending therein;
said axial passageway having at least one open axial end;
said axial passageway having a diameter of at least about four inches;
said main inner cylinder structure having a bridge extending across its upper end;
said bridge being adapted to have a solenoid firing valve mounted thereon;
said bridge having triggering air passages therein for communicating with a solenoid valve mounted on said bridge;
said main inner cylinder structure having a flange top wall extending radially outwardly to a peripheral portion thereof;
an annular side wall extending axially down from said peripheral portion of the flange top wall defining an outer annular side wall of an annular operating chamber;
said annular operating chamber being positioned below said flange top wall and positioned inside of said annular side wall and positioned outside of said main inner cylinder structure;
at least one of said triggering air passages in said bridge communicating with said annular operating chamber;
said main inner cylinder structure having an outwardly-facing cylinder surface adapted to have at least one sleeve bearing thereon in encircling relationship around said main inner cylinder structure for guiding a cylinder shuttle; and
a lower end of said main inner cylinder structure having means for mounting a removable annular wall in encircling relationship around said main inner cylinder structure for defining an annular firing chamber positioned inside of said removable annular wall and positioned outside of said main inner cylinder structure.

22. A method for generating seismic pressure waves in a body of water comprising the steps of:
confining compressed air in an annular firing chamber having a generally annular configuration concentric with an axis;
said confined compressed air having a pressure suitable upon sudden release into the body of water for generating seismic pressure waves in the body of water;
said annular firing chamber having a diameter greater than 6 inches and having a median diameter greater than 7 inches and having a median circumference greater than 22 inches;
suddenly discharging compressed air from said annular firing chamber at inception of discharge being in a toroidal bubble having an initial diameter greater than 8 inches and an initial circumferential expanse of more than 25 inches;
thereby at inception of discharge initially employing toroidal bubble geometry in a toroidal bubble of initial diameter greater than 8 inches and initial circumferential expanse of more than 25 inches wherein area $S_t$ and volume $V_t$ are defined by respective formulas:

$$S_t = 4\pi^2 Cr$$

$$V_t = 2\pi^2 Cr^2$$

wherein C is a radial distance from a central axis of a torus to a central point of a circular cross section of radius r of the torus as compared with spherical bubble geometry wherein surface area $S_s$ and volume $V_s$ are defined by respective formulas:

$$S_s = 4\pi R^2$$

$$V_s = 4/3 \pi R^3$$

wherein R is a radius of a sphere;
thereby at inception of discharge initially providing the larger surface area of a toroidal bubble of initial diameter greater than 8 inches and initial circumferential expanse of more than 25 inches as compared with the surface area of a spherical bubble for an equal volume of confined compressed air at said pressure and as compared with the surface area of a toroidal bubble of smaller initial diameter and smaller initial circumferential expanse for an equal volume of confined compressed air at said pressure.

* * * * *